A. T. HUGHES.
NON-SKIDDING BAND FOR TIRES.
APPLICATION FILED JUNE 15, 1915.
1,176,560.
Patented Mar. 21, 1916.
2 SHEETS—SHEET 1.
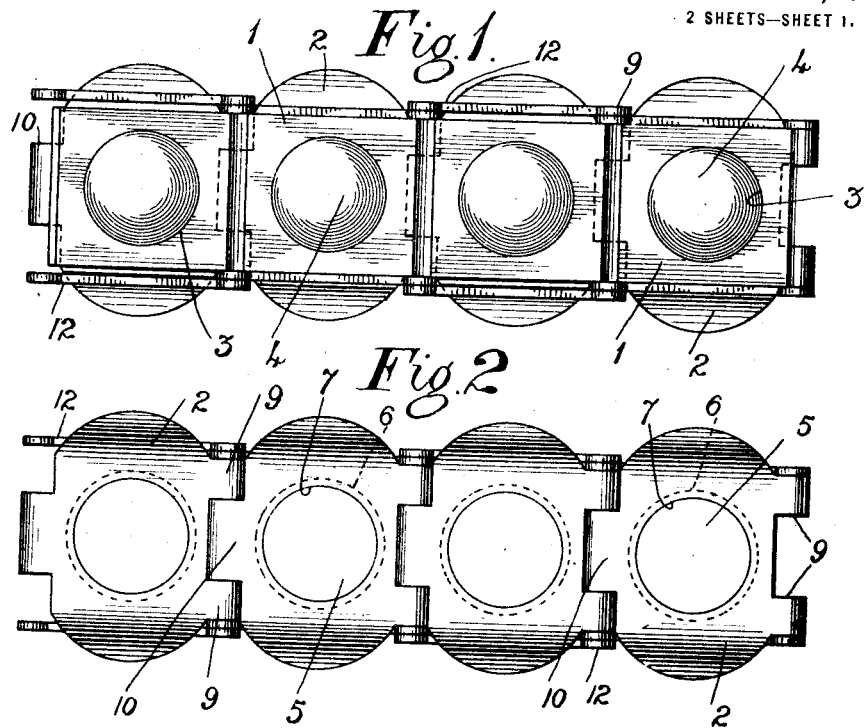
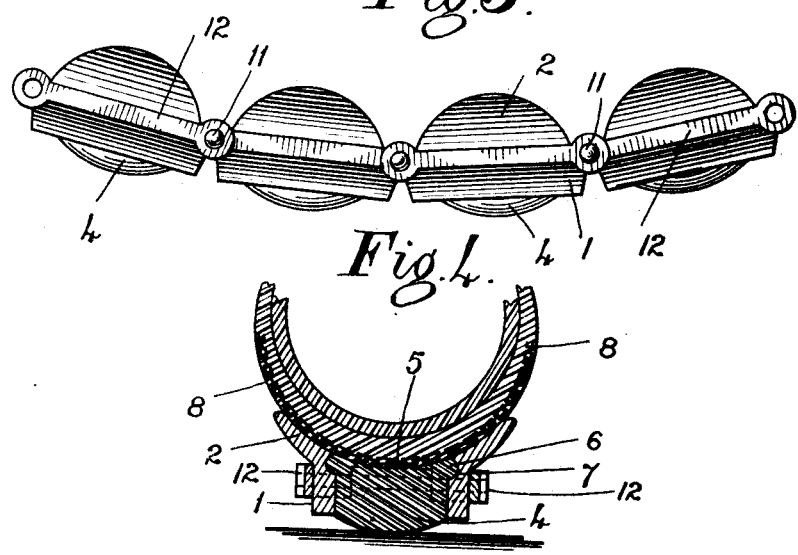

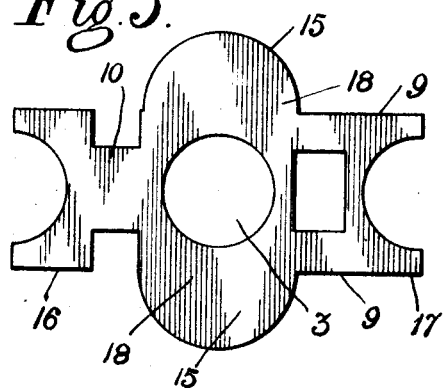
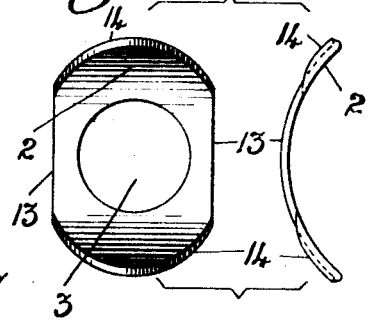
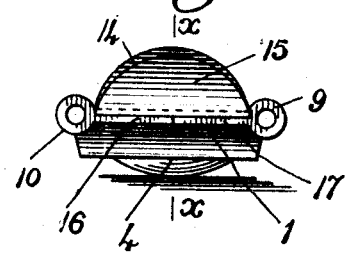
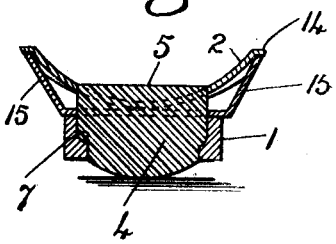
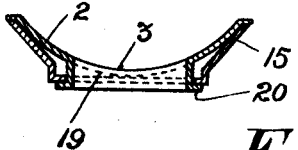
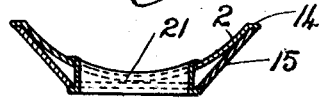
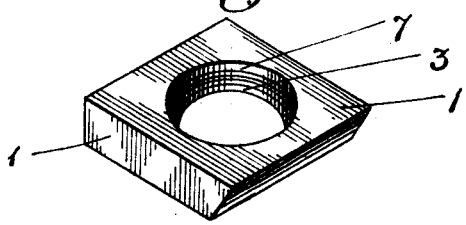

UNITED STATES PATENT OFFICE.

ALBERT THOMAS HUGHES, OF KEW GREEN, ENGLAND.

NON-SKIDDING BAND FOR TIRES.

1,176,560.   Specification of Letters Patent.   Patented Mar. 21, 1916.

Application filed June 15, 1915.  Serial No. 34,216.

*To all whom it may concern:*

Be it known that I, ALBERT THOMAS HUGHES, a subject of the King of Great Britain, residing at Kew Green, Surrey, England, have invented certain new and useful Improvements in Non-Skidding Bands for Tires, of which the following is a specification.

The object of this invention is to construct in an improved manner that class of pneumatic, solid, or cushion tire protector and non-skidding band, formed from segments hinged together, each segment having a rubber plug positioned in a hole of the segment, so that the bases of the rubber plugs will bear upon the tire, and their tops form the tread surfaces which come in contact with the road.

My present invention consists in constructing a protector and non-skidding band for tires of wheels from a number of perforated segments hinged together by hinge pins with the hinge pins connected together by links at each side of the band, each perforated segment having a curved base for engaging the tire and being composed of a single piece; or, of a combined perforated curved plate, a securing plate for said curved plate and a perforated base; or, of a combined perforated curved plate having an extension tube, a supporting member for the curved plate and perforated base. Each segment carries in its perforation a rubber plug projecting at each end from the segment to form a tread surface and a base to bear against the pneumatic tire.

The invention will be clearly understood from the following description aided by the examples shown on the annexed drawings and in which:—

Figure 1 is a view looking upon the tread surface of a portion of a band and showing a number of complete units connected together. Fig. 2 is a view similar to Fig. 1 but looking at the band from the tire side. Fig. 3 is a side elevation of a portion of the device. Fig. 4 is a section of a portion of a pneumatic tire and one of the complete units. In all these figures each hinged segment is formed from one piece of metal. Fig. 5 is a view of a blank forming one member of a unit made up from several pieces of metal. Fig. 6 is another piece of metal forming another member of a unit. Fig. 7 is another piece of metal forming another member of a unit. Fig. 8 is a side elevation of a unit with the members shown in Figs. 5, 6, and 7, and the rubber plug in position. Fig. 9 is a section on the line *x x* of Fig. 8. Figs. 10 and 11 are sections of modified constructions and methods of connection of the members shown in Figs. 5 and 6.

According to this invention I form each segment 1 from one or a number of pieces with a curved base 2 to lie across and come in immediate contact with the tire, and hold the band on to the tire when the latter is inflated without the use of side chains or connections as is usual, and I further connect each of the hinge pins 11 by links in each side of the band to afford extra strength.

In the center of each segment is a perforation 3 in which I place a plug 4 of india rubber the base 5 of which may be enlarged or flanged as at 6 to take into an undercut portion or recess 7 of the perforation 3 in such manner that said base 5 will rest or bear upon the pneumatic tire 8 when the latter is pumped up thus forming a cushion for the protector upon the tire.

The segments 1 are provided with tubes 9, 9, 10 on opposite edges which tubes 9, 9 engage with the neighboring tubes 10 of the next segment and are connected together by pins 11 after the style of hinge joints. Links 12 are positioned on each side of the segments and connected to the pins 11 to afford extra strength to the band. The segments may each be formed of one piece as in Figs. 1 to 4 or they may be built up of several pieces as in Figs. 5 to 11.

According to Figs. 5 to 9, I form the segments of a curved plate 2 (see Fig. 6) having a perforation 3 and two oppositely straight sides 13 and with lips 14 on portions of the curved edges. I construct an arch or bridge piece as in Fig. 5 and I bend the portions 15, 15 at an angle, see Fig. 9, and bend the portions 9, 9 and 10 until they form tubes, see Fig. 8, with the portions 16 and 17 lying flat upon the flat portion 18 of the bridge, see Fig. 8, the portions 16, 17 being recessed so that when their ends meet the recesses correspond with the perforation 3 formed in the bridge Fig. 5. I then place the curved plate 2 Fig. 6, on to the bridge member, Fig. 5, with the lipped portions 14 engaging the curved edge of the portion 15, 15 to assist in holding the plate 2 and the bridge together, see Fig. 9.

I then place a base block, see Fig. 7, on the flat side of the bridge, see Fig. 9, and braze or rivet the whole three pieces together and this with the plug 4 forms one complete unit to be connected together by the pins 11, as in Figs. 1 to 4. As will be seen the perforations in each of the three members correspond and register.

According to Fig. 10, I provide the plate 2 with an extension tube 19 from the perforation 3 and pass it through the perforation in the bridge, burring over the end 20 on to the bridge to assist in securing the two together, or I may further assist in connecting the plate 2 and the bridge together by an eyelet 21 passed through the perforations as in Fig. 11.

What I do claim as my invention is:—

A band for tires consisting of a number of perforated segments hinged together by hinge pins with the hinge pins connected together by links at each side of the band, each segment having a curved base for engaging the tire and carrying a rubber plug projecting at each end from the segment to form a tread surface and a base to bear against the pneumatic tire.

In testimony whereof I have hereunto set my hand in presence of two subscribing witnesses.

ALBERT THOMAS HUGHES.

Witnesses:
CHARLES A. GROSSETETE,
LYNWOOD GARDNER.